United States Patent
Nagatani et al.

(10) Patent No.: US 7,969,205 B2
(45) Date of Patent: Jun. 28, 2011

(54) PEAK POWER REDUCTION METHOD

(75) Inventors: Kazuo Nagatani, Kawasaki (JP);
Hajime Hamada, Kawasaki (JP);
Hiroyoshi Ishikawa, Kawasaki (JP);
Nobukazu Fudaba, Kawasaki (JP);
Yuichi Utsunomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/577,019

(22) Filed: Oct. 9, 2009

(65) Prior Publication Data

US 2010/0148828 A1 Jun. 17, 2010

Related U.S. Application Data

(63) Continuation of application No. PCT/JP2007/058185, filed on Apr. 13, 2007.

(51) Int. Cl.
*H03B 21/00* (2006.01)
(52) U.S. Cl. ............................ 327/105; 370/208; 375/260
(58) Field of Classification Search ................... 327/105
See application file for complete search history.

(56) References Cited

U.S. PATENT DOCUMENTS

| | | | |
|---|---|---|---|
| 5,045,799 A * | 9/1991 | Holecek ......................... 327/105 |
| 6,522,869 B1 | 2/2003 | Hiramatsu et al. |
| 2003/0063685 A1 | 4/2003 | Yoshida |
| 2005/0008094 A1 * | 1/2005 | Kramer et al. ................. 375/296 |
| 2006/0098747 A1 * | 5/2006 | Yue et al. ....................... 375/260 |
| 2006/0115010 A1 * | 6/2006 | Rog et al. ....................... 375/260 |
| 2006/0189279 A1 | 8/2006 | Kobayashi |
| 2007/0237247 A1 * | 10/2007 | Schaepperle et al. ......... 375/260 |
| 2008/0069254 A1 * | 3/2008 | Cosovic ......................... 375/260 |
| 2008/0089437 A1 * | 4/2008 | Frederiksen et al. ......... 375/296 |
| 2008/0200126 A1 * | 8/2008 | Okada et al. .................... 455/46 |
| 2009/0052577 A1 * | 2/2009 | Wang ............................. 375/299 |
| 2009/0092195 A1 * | 4/2009 | Guo et al. ....................... 375/260 |
| 2009/0103639 A1 * | 4/2009 | Sankabathula et al. ....... 375/260 |
| 2010/0029347 A1 * | 2/2010 | Hellberg ........................ 455/574 |
| 2010/0098139 A1 * | 4/2010 | Braithwaite ................... 375/219 |
| 2010/0124296 A1 * | 5/2010 | Rajagopal ...................... 375/260 |
| 2010/0150256 A1 * | 6/2010 | Morris et al. .................. 375/260 |

FOREIGN PATENT DOCUMENTS

JP 2002-271296 A 9/2002

(Continued)

OTHER PUBLICATIONS

International Search Report dated Jul. 17, 2007 based on International Application No. PCT/JP2007/058185.

*Primary Examiner* — Lincoln Donovan
*Assistant Examiner* — William Hernandez
(74) *Attorney, Agent, or Firm* — Murphy & King, PC

(57) ABSTRACT

A technique wherein when signals, the modulation schemes of which are different, are to be combined, performing the peak suppression using amounts of the respective modulation schemes can effectively reduce the PAPR of a resulting combined signal. A peak suppressing method for use in a peak suppressing circuit, which combines input signals of different modulation schemes in a time domain to provide a combined signal, comprises detecting, as a peak, that portion of the combined signal which excesses a threshold value to generate a peak signal in accordance with the peak; converting the peak signal into a frequency domain signal and then dividing it into signals originating from the input signals to use these input-signal-originated signals as respective suppression signals; and adding, to the input signals, the suppression signals having different suppression amounts for the respective modulation schemes, thereby performing the peak suppression.

19 Claims, 12 Drawing Sheets

FOREIGN PATENT DOCUMENTS

| | | |
|---|---|---|
| JP | 2003-249910 A | 9/2003 |
| JP | 2004-147126 A | 5/2004 |
| JP | 2004-336564 A | 11/2004 |
| WO | 99/56425 A1 | 11/1999 |
| WO | 01/65748 A1 | 9/2001 |
| WO | 2005/015799 A1 | 2/2005 |

* cited by examiner

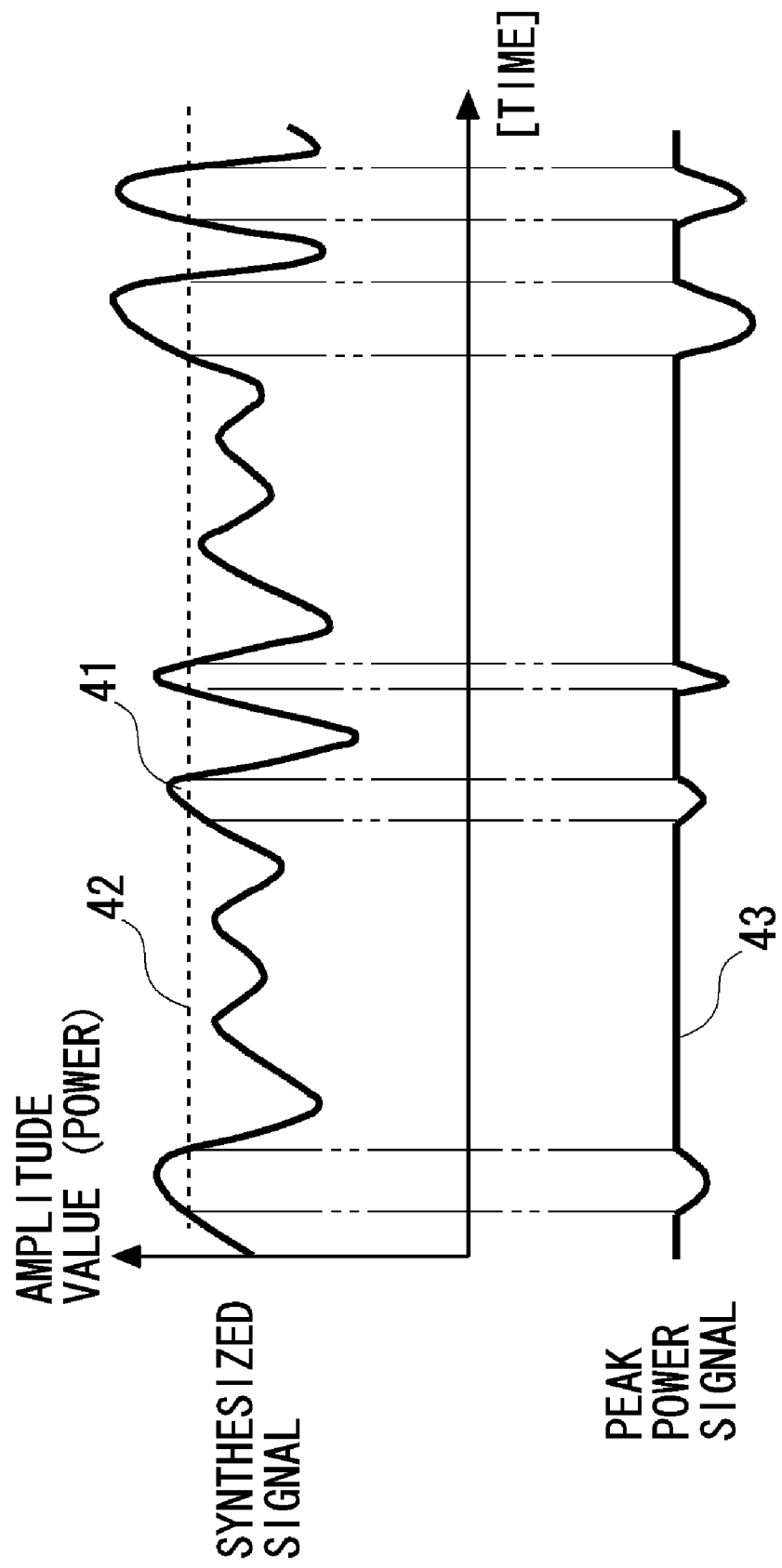

PEAK POWER REDUCTION METHOD

CROSS-REFERENCE TO RELATED APPLICATION

This is a continuation of Application PCT/JP2007/058185, filed on Apr. 13, 2007, now pending, the contents of which are herein wholly incorporated by reference.

TECHNICAL FIELD

The present invention relates to a technology of multiplexing signals taking different modulation methods.

BACKGROUND ART

An OFDM (Orthogonal Frequency Division Multiplexing) modulation method is given as one of digital modulation methods used for wireless communications. In the OFDM modulation method, subcarriers of multicarrier signals are overlapped with each other, resulting in occurrence of high peak power in output signals.

If the peak power of the output signal exceeds a dynamic range of a circuit (e.g., an amplifier and an optical modulator) within an OFDM communication device, a nonlinear distortion occurs in a transmission signal, which might induce deterioration of a transmission characteristic. Such being the case, there is a necessity for designing sufficiently large back-off of a posterior circuit by taking account of Peak to Average Power Ratio (PAPR) of the output signal.

Accordingly, if the PAPR of the output signal becomes too large, the posterior circuit might be upsized, and power efficiency might also be deteriorated. Therefore, a measure for reducing peak amplitude (peak power) of the output signal is taken.

Further, a technology disclosed in, e.g., Patent document 1 given below is exemplified as the prior art related to the invention of the present application.

[Patent document 1]
Japanese Patent Laid-Open Publication No. 2002-271296

DISCLOSURE OF THE INVENTION

Problems to be Solved by the Invention

The PAPR can be decreased by reducing the peak power, however, if the peak power is excessively reduced, a data symbol of the signal is distorted, with the result that proper demodulation can not be performed on a receiving side.

Hence, a peak power reduction quantity is determined based on the modulation method of the input signal within a signal distortion allowable range, i.e., to such an extent that the proper demodulation can be conducted.

On the other hand, a communication system based on WiMAX (Worldwide Interoperability for Microwave Access) and LTE (Long Term Evolution), which is examined as a mobile communication system of the next generation, is capable of transmitting together the signals modulated by different modulation methods such as QPSK (Quadrature Phase Shift Keying) and QAM (Quadrature Amplitude Modulation).

In this case, the peak power reduction quantity is determined within an allowable range of the modulation method having the highest quality, i.e., the modulation method having the narrowest distortion allowable range.

For example, in the case of using signals of QPSK, 16QAM and 64QAM, the peak power reduction quantity must be determined so that the 64QAM signal can be properly demodulated.

Accordingly, with respect to the signals of the low-quality QPSK and 16QAM, the peak power reduction quantity is small, and the PAPR does not become sufficiently small.

Namely, such a problem exists that a scheme of downsizing the circuit and improving the power efficiency is not well attained.

Means for Solving the Problems

The present invention adopts the following configurations in order to solve the problems given above.

Namely, a peak power reduction circuit according to the present invention includes: a synthesized signal generating unit generating synthesized signals in a time domain from input signals taking different modulation methods; a peak power detecting unit detecting a region, exceeding a threshold value, of the synthesized signal as peak power and generating a peak power signal corresponding to the peak power; a reduction signal generating unit converting the peak power signal into a signal in a frequency domain, segmenting the signal into signals deriving from the input signals, and organizing the signals deriving from the input signals into reduction signals; and a reducing unit reducing the peak power by adding the reduction signal with a reduction quantity differentiated on a per-modulation-method basis to the input signal.

Further, a transmitting device according to the present invention includes: a peak power reduction circuit reducing peak power of an input signal: and an output circuit amplifying and outputting a transmission signal from the peak power reduction circuit, the peak power reduction circuit including: a synthesized signal generating unit generating synthesized signals in a time domain from input signals taking different modulation methods; a peak power detecting unit detecting a region, exceeding a threshold value, of the synthesized signal as peak power and generating a peak power signal corresponding to the peak power; a reduction signal generating unit converting the peak power signal into a signal in a frequency domain, segmenting the signal into signals deriving from the input signals, and organizing the signals deriving from the input signals into reduction signals; and a reducing unit reducing the peak power by adding the reduction signal with a reduction quantity differentiated on a per-modulation-method basis to the input signal.

The reducing unit may differentiate the reduction quantity in a way that multiplies the reduction signal by a coefficient that is different on a per-modulation-signal basis. It should be noted that in the input signals taking the different modulation methods, a coefficient of the reduction signal added to the input signal taking the modulation method having a high tolerance of modulation accuracy may be set higher than a coefficient of the reduction signal added to the input signal taking the modulation method having a low tolerance of the modulation accuracy.

The reduction quantity of the reduction signal may be differentiated by detecting the peak power by use of a threshold value different on the per-modulation-signal basis.

The peak power reduction circuit may further include a rate detecting unit obtaining a rate of the input signals on the per-modulation-method basis, which occupy the whole input signals, wherein the peak power detecting unit may determine the threshold value in accordance with the rate.

The peak power reduction circuit may further include a power compensating unit obtaining a decrease in average power due to the reduction of the peak power of the input signal on the basis of the input signal, and adding the power equivalent to the obtained decrease to the input signal.

The power compensating unit may obtain the decrease in power by comparing the input signal before reducing the peak power with the input signal after reducing the peak power.

The peak power reduction circuit may further include plural sets of the synthesizing units, the peak power detecting units, the reduction signal generating units and the reducing units, wherein the peak power may be reduced at multi-stages.

The peak power reduction circuit may further include a window function reducing unit reducing the peak power of the signal after the reduction of the peak power by use of a window function method.

Still further, a peak power reduction method is a method by which a peak power reduction circuit executes: generating synthesized signals in a time domain from input signals taking different modulation methods; detecting a region, exceeding a threshold value, of the synthesized signal as peak power and generating a peak power signal corresponding to the peak power; converting the peak power signal into a signal in a frequency domain, segmenting the signal into signals deriving from the input signals, and organizing the signals deriving from the input signals into reduction signals; and reducing the peak power by adding the reduction signal with a reduction quantity differentiated on a per-modulation-method basis to the input signal.

In the peak power reduction method, the reduction quantity may be differentiated in a way that multiplies the reduction signal by a coefficient that is different on a per-modulation-signal basis.

In the peak power reduction method, in the input signals taking the different modulation methods, a coefficient of the reduction signal added to the input signal taking the modulation method having a high tolerance of modulation accuracy may be set higher than a coefficient of the reduction signal added to the input signal taking the modulation method having a low tolerance of the modulation accuracy.

In the peak power reduction method, the reduction quantity of the reduction signal may be differentiated by detecting the peak power by use of a threshold value different on the per-modulation-signal basis.

In the peak power reduction method, a rate of the input signals on the per-modulation-method basis, which occupy the whole input signals, may be obtained, and the threshold value may be determined in accordance with the rate.

In the peak power reduction method, a decrease in average power due to the reduction of the peak power of the input signal may be obtained based on the input signal, and the decrease in power may be compensated by adding the power equivalent to the obtained decrease to the input signal.

In the peak power reduction method, the decrease in power may be obtained by comparing the input signal before reducing the peak power with the input signal after reducing the peak power.

The reduction may be repeated plural number of times in a way that sets the signal after reducing the peak power as the input signal.

In the peak power reduction method, the peak power of the signal after the reduction of the peak power may be reduced by use of a window function method.

BRIEF DESCRIPTION OF THE DRAWINGS

FIG. 3 is an explanatory diagram of a synthesized signal.

Figure 1:
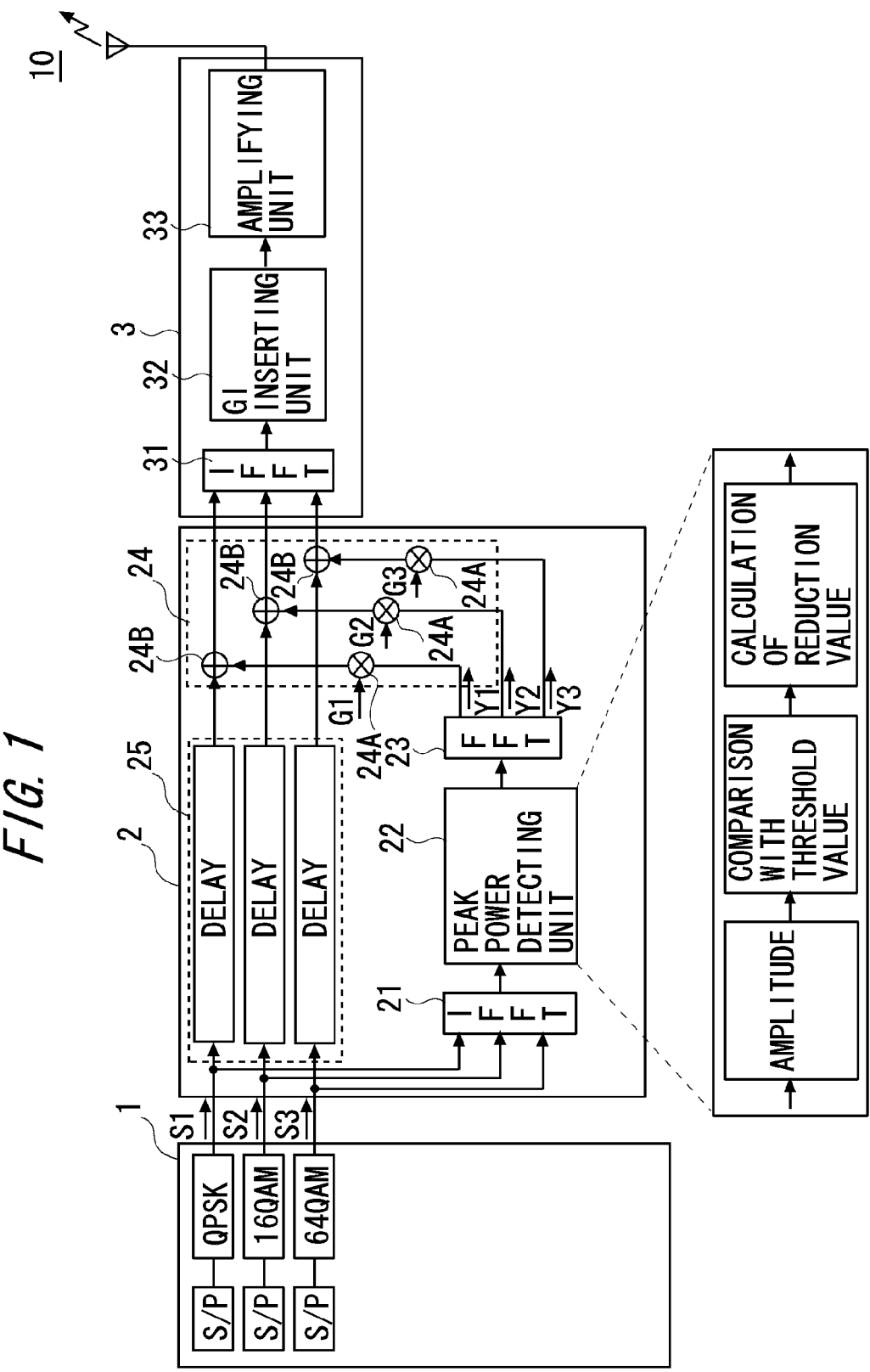
FIG. 1 is a schematic diagram of a configuration of a transmitting device in a first embodiment according to the present invention.

DESCRIPTION OF THE REFERENCE NUMERALS AND SYMBOLS 1 input-side circuit
2 peak power reduction circuit
3 output circuit
10 transmitting device
21 IFFT unit (synthesizing unit)
22 peak power detecting unit
23 reduction signal generating unit
24 reducing unit
25 delay unit
26, 27 power compensating unit
31 synthesizing unit
32 GI inserting unit
33 amplifying unit

BEST MODE OF CARRYING OUT THE INVENTION

A best mode for carrying out the present invention will hereinafter be described with reference to the drawings. Configurations in the following embodiments are exemplifications, and the present invention is not limited to the configurations in the embodiments.

First Embodiment

FIG. 1 is a schematic diagram of a transmitting device according to the present invention. A transmitting device 10 in the first embodiment is provided in a base transceiver station (base station) for mobile communications, and transmits input signals (which will hereinafter be termed modulation signals) taking a plurality of different modulation methods such as QPSK, 16QAM and 64QAM via one power amplifier (transmitting unit).

As depicted in FIG. 1, the transmitting device 10 includes an input-side circuit 1, a peak-power reduction circuit 2 and an output circuit 3.

Figure 2:
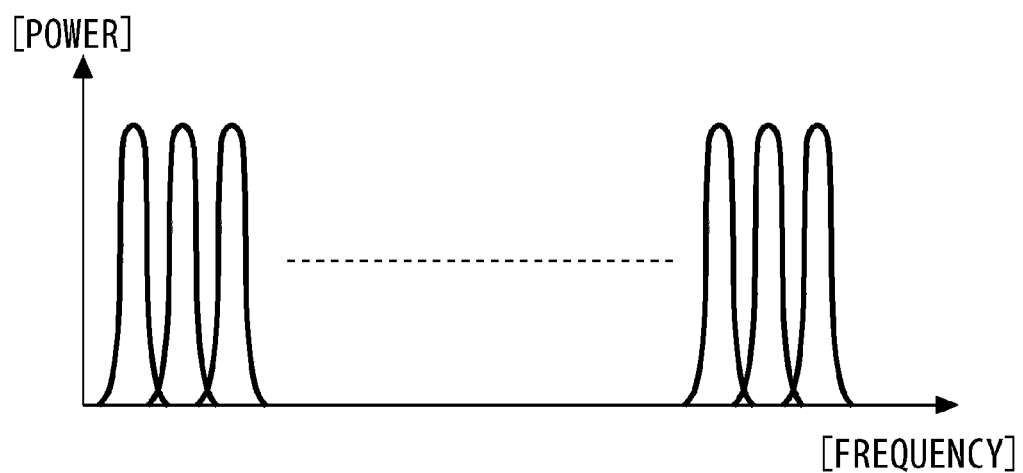
FIG. 2 is an explanatory diagram of a modulation signal.

The input-side circuit 1 transmits the modulation signals taking a predetermined method to a posterior circuit which is the peak-power reduction circuit 2 in the first embodiment. The modulation signals are received from another device, or alternatively signals received from another device such as a mobile communication device are modulated by the predetermined method into the modulation signals. Note that the input-side circuit 1 executes serial-parallel conversion (S/P conversion) of the input signals, thereby transmitting data with a plurality of subcarriers set at a predetermined frequency interval as depicted in FIG. 2.

The modulation method of the input-side circuit 1 is the QPSK in the case of voice communications and is the QAM in the case of data communications, in which the signals may be thus modulated by the preset method corresponding to signals (identifying signals) for specifying details of the data and a type of a terminal, and the modulation method may also be changed to the 16QAM in the case of a high error rate and the 64QAM in the case of a low error rate corresponding to a state of the communications.

The output circuit 3 includes a synthesizing unit 31, a GI (Guard Interval) inserting unit 32 and an amplifying unit 33, whereby modulation signals S1-S3 transmitted from the input-side circuit 1 are synthesized into transmission signals and are, after being amplified, wirelessly output.

The peak-power reduction circuit 2 obtains peak power in the case of synthesizing the modulation signals S1-S3 transmitted from the input-side circuit 1, generates a peak power reduction signal corresponding to this peak power, and reduces the peak power with respect to each of the modulation signals S1-S3 on the basis of the peak power reduction signal.

The peak power reduction circuit 2 includes an IFFT unit (synthesizing) 21, a peak power detecting unit 22, a reduction signal generating unit 23, a reducing unit 24 and a delay unit 25.

The IFFT unit 21 converts (IFFT-processes) the modulation signals (input signals) taking the different modulation methods from the signals in a frequency domain into the signals in a time domain, thereby generating the synthesized signals.

The peak power detecting unit 22 detects amplitude (power) of the synthesized signal, which exceeds a threshold value, as the peak power, and generates the peak power signal corresponding to this peak power.

The reduction signal generating unit 23 converts (FFT-processes) the peak power signals from the signals in the time domain into the signals in the frequency domain, then segments the signals into signals deriving from the respective modulation signals, and organizes the signals deriving from the modulation signals into the reduction signals.

The reducing unit 24 adds the reduction signal multiplied by a coefficient different on a per-modulation-method basis to the input signal, and thus reduces the peak power.

A peak power reduction method by the transmitting device 10 having the configuration described above will next be described.

The transmitting device 10, when the input-side circuit 1 receives the radio signals from a mobile terminal (user equipment), modulates the radio signals by the predetermined method and transmits the thus-modulated signals (input signals) to a posterior circuit. The transmitting device in the first embodiment supports the plurality of modulation methods, and transmits the input signals taking the different modulation methods.

The peak power reduction circuit 2 inputs the input signals S1-S3 from the input-side circuit 1 to the delay unit 25. Further, the peak power reduction circuit 2, for detecting the peak power, branches off some of the input signals S1-S3, and the input signals undergo the IFFT-processing in the IFFT unit 21, resulting in the synthesized signals (FIG. 3).

The peak power detecting unit 22 compares, as illustrated in FIG. 3, a synthesized signal 41 converted into the signal in the time domain with a threshold value 42, and detects the amplitude (the power indicated by hatching) exceeding the threshold value 42 as the peak power. Then, the peak power detecting unit 22 extracts the peak power region and inverts a phase thereof corresponding to the peak power so as to cancel the peak power, thereby obtaining a peak power signal 43.

The reduction signal generating unit 23 segments this peak power signal into signals (reduction signals) Y1-Y3 in the frequency domain, which derive from the input signals S1-S3, through the FFT-processing. Namely, the subcarriers of the input signals S1-S3 are reduced by the reduction signals Y1-Y3 to thereby cancel the peak power and enable the transmission signals to be controlled down to the predetermined value or under.

Figure 4A:
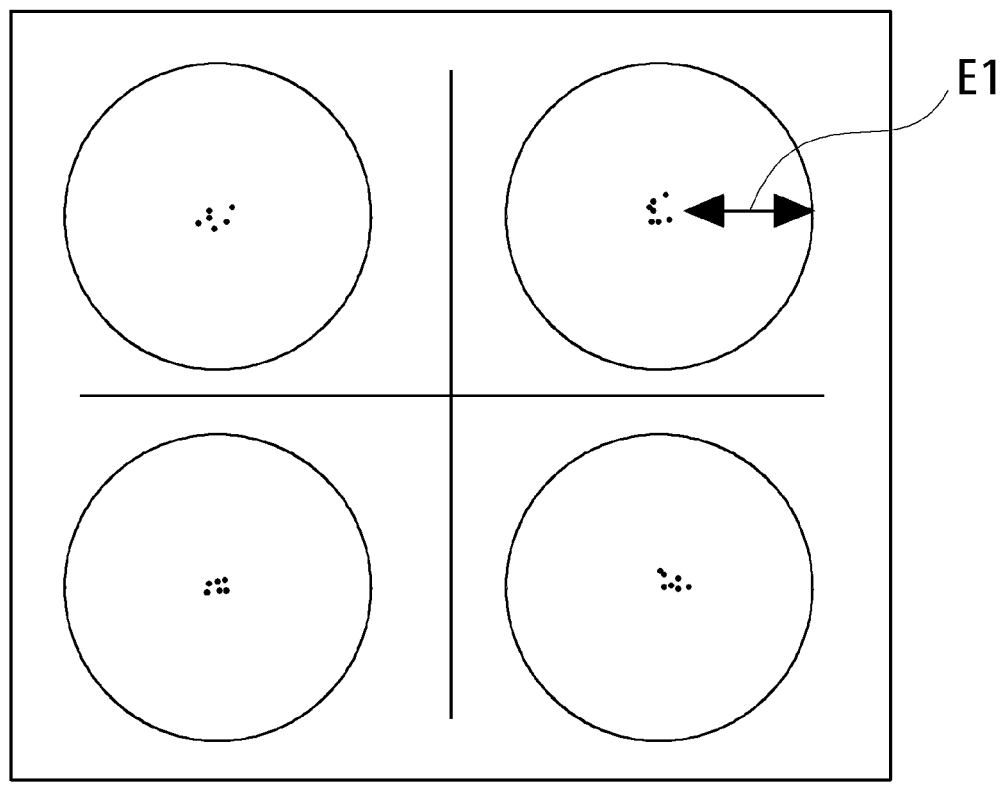
FIG. 4A is a diagram illustrating a constellation pattern of the modulation signal based on a QPSK method.

Herein, modulation accuracy (Error Vector Magnitude: EVM) allowable to the input signals S1-S3 is different on the per-modulation-method basis. FIG. 4A illustrates a constellation pattern formed by plotting the respective values of the input signal S1 modulated by the QPSK, FIG. 4B depicts the constellation pattern formed by plotting the respective values of the input signal S2 modulated by the 16QAM, and FIG. 4C depicts the constellation pattern formed by plotting the respective values of the input signal S3 modulated by the 64QAM.

Figure 4B:
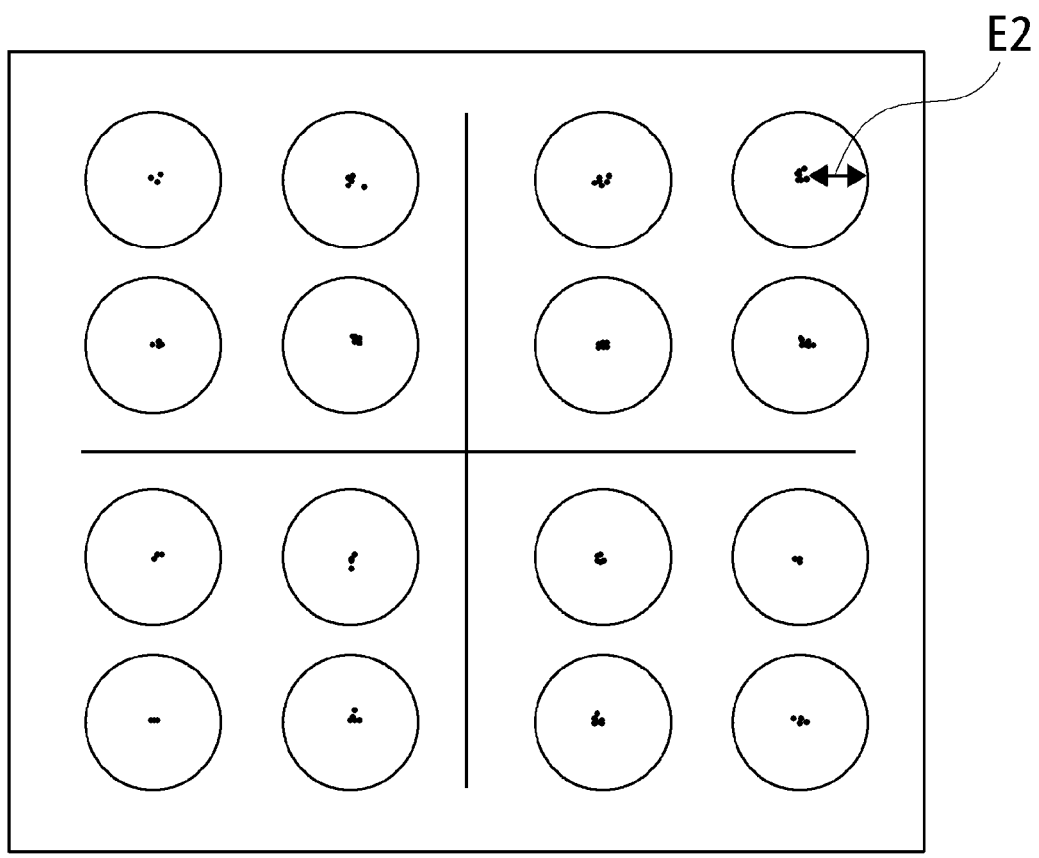
FIG. 4B is a diagram illustrating a constellation pattern of the modulation signal based on a 16QAM method.
Figure 4C:
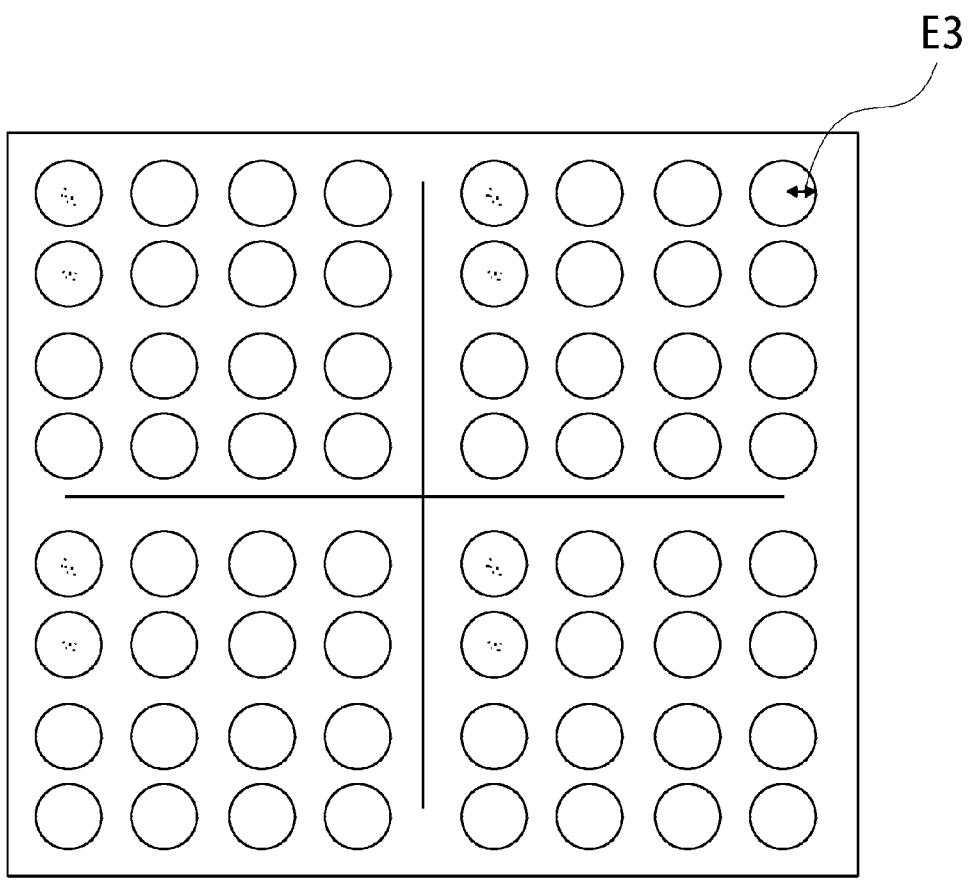
FIG. 4C is a diagram illustrating a constellation pattern of the modulation signal based on a 64QAM method.

In FIGS. 4A through 4C, the points representing the individual values are required to converge within such a range as not to intermingle with other value points. At this time, a definable range, which is, i.e., the allowable EVM, is depicted by a circle. As apparent from FIGS. 4A through 4C, let E1 be the EVM allowable to the input signal S1, let E2 be the EVM allowable to the input signal S2 and let E3 be the EVM allowable to the input signal S3, and a relationship therebetween is given by E1>E2>E3.

Accordingly, if the peak power reduction is conducted by adding the reduction signal uniformly to the individual input signals S1-S3, it follows that a reducible peak power quantity is restricted to E3.

Such being the case, a scheme in the first embodiment is that an adjusting unit 24A of the reducing unit 24 adjusts the reduction quantity on the per-modulation-method basis in a way that multiplies the reduction signal by the coefficient different on the per-modulation-method basis. Specifically, the reduction signal Y1 is multiplied by 1, the reduction signal Y2 is multiplied by 0.2, and reduction signal Y3 is multiplied by 0.1. Note that these coefficients can be arbitrarily set based on, without being limited to the values described above, the modulation method of each modulation signal and a dynamic range etc of the output circuit 3.

Further, the adjusting unit 24A may restrict the value of each of the reduction signals Y1-Y3 to a value less than a predetermined upper limit value which is different on the per-modulation-method basis. For example, the upper limit values of the reduction signals Y1-Y3 are set to M1-M3 (where M1>M2>M3), and the adjusting unit 24A, if the reduction signals Y1-Y3 are equal to or larger than the upper limit values M1-M3, cuts these excesses over M1-M3. The EVMs of the post-reduction input signals S1-S3 can be thereby surely converged within the predetermined ranges.

The reducing unit 24 adds the reduction signals Y1-Y3 after being adjusted by the adjusting unit 24A to the main signals (modulation signals) S1-S3 via the delay unit 25 at a reducing point 24B. The reduction signals Y1-Y3 are generated based on the peak power signals with the inverted phases of the peak power regions and therefore reduce the peak power of the main signals S1-S3 with the additions given above.

Note that the delay unit 25 herein delays the main signals S1-S3 by a period of time expended for generating the reduction signals Y1-Y3, thereby synchronizing the main signals S1-S3 with the reduction signals Y1-Y3.

Then, in the output circuit 3, the synthesizing unit 31 converts (IFFT-processes) the post-reduction modulation signals S1-S3 from the signals in the frequency domain into the signals in the time domain and synthesizes the signals, the GI inserting unit 32 inserts the guard intervals in between the signals to thereby obtain transmission signals, then the amplifying unit 33 amplifies the signals, and the radio signals are thus output.

Thus, according to the first embodiment, in the case of synthesizing the signals taking the different modulation methods and thus transmitting the synthesized signals, the peak power can be reduced with a proper quantity corresponding to the modulation method for each signal in such a way that the reduction quantity of the input signal having a high quality can be set small, while the reduction quantity of the input signal having a low quality can be set large. This scheme enables the PAPR of the transmission signal to be effectively decreased, the output circuit (the amplifying unit) to be downsized and the power efficiency to be improved.

Second Embodiment

Figure 5:
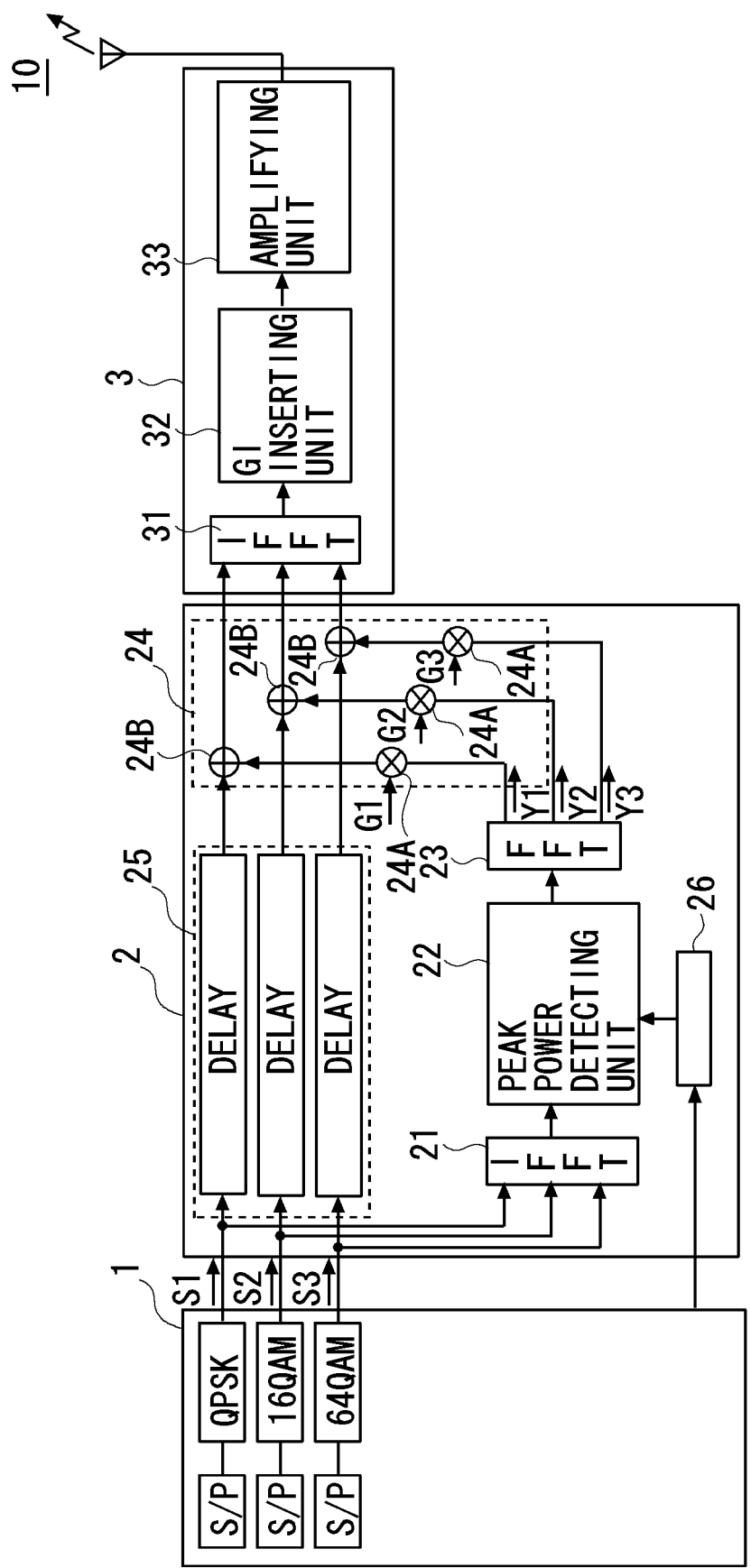
FIG. 5 is a schematic diagram of a configuration of the transmitting device in a second embodiment according to the present invention.

FIG. 5 is a schematic diagram of a second embodiment according to the present invention. As compared with the first embodiment discussed above, the second embodiment has a difference in terms of such a point that the peak power reduction circuit further includes a rate detecting unit which obtains a rate of the modulation method, while other configurations are the same. Note that the same components are marked with the same reference numerals and symbols, and the iterative explanations thereof are omitted.

A rate detecting unit 26 obtains a rate of the input signals on the per-modulation-method basis, which occupy the whole input signals transmitted from the input-side circuit 1.

The rate detecting unit 26 in the second embodiment receives pieces of information indicating quantities of the respective input signals from the input-side circuit 1, and obtains the rate on the per-modulation-method basis by collecting these pieces of information. Note that a technique for obtaining the rate may include, without being limited to the technique described above, a technique for counting a signal count and a subcarrier count on the per-modulation-method basis, a technique for obtaining the rate by the input-side circuit 1 and receiving this rate, or a technique for receiving information on the rate inputted by an administrator.

The peak power detecting unit 22 determines a threshold value on the per-modulation-method basis corresponding to the rate obtained by the rate detecting unit 26.

For example, a threshold value La is set if the modulation signals of the QPSK are less than 30% of the whole signals, a threshold value Lb is set if equal to or larger than 30% but less than 60%, and a threshold value Lc is set if over 60% (where La>Lb>Lc), in which the threshold value in a case where the rate of the modulation signals having the low quality is lower than the predetermined value is set higher than the threshold value in a case where the rate is higher than the predetermined value. With this contrivance, the reduction quantity is decreased in the case of containing the small amount of modulation signals having the low quality but increased in the case of containing the large amount of modulation signals having the low quality.

Similarly, the threshold value in the case where the rate of the modulation signals having the high quality is higher than the predetermined value may be set higher than the threshold value in the case where the rate is lower than the predetermined value.

Then, the peak power detecting unit 22 detects the peak power by use of the determined threshold value, and the reduction signal generating unit 23 generates the reduction signal.

Thus, according to the second embodiment, the threshold value is changed corresponding to the rate of the modulation method to thereby change the reduction quantity of each modulation signal, and it is therefore feasible to adequately reduce the peak power even when the rate of the modulation method of the modulation signal changes.

Third Embodiment

Figure 6:
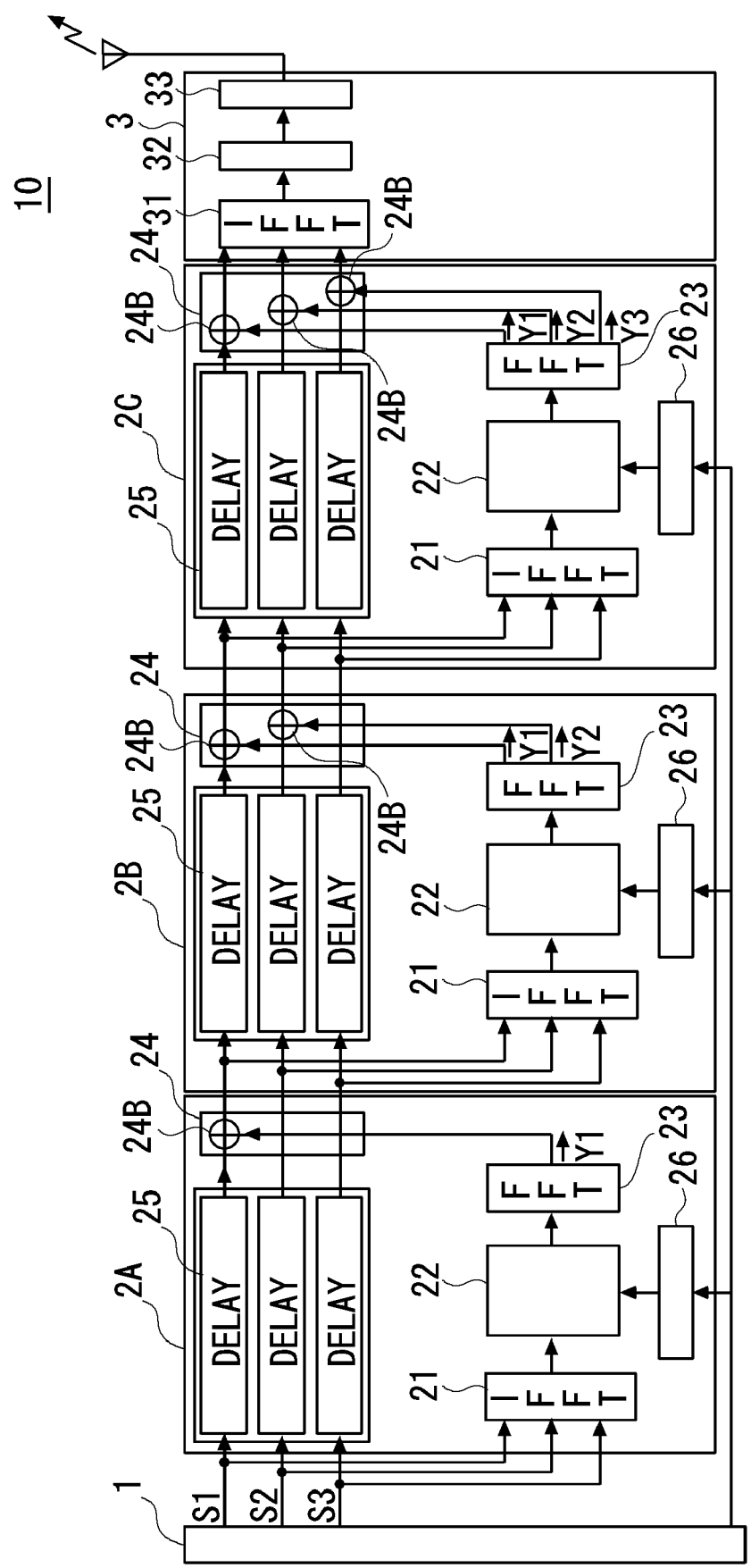
FIG. 6 is a schematic diagram of a configuration of the transmitting device in a third embodiment according to the present invention.

FIG. 6 is a schematic diagram of a third embodiment according to the present invention. As compared with the second embodiment discussed above, the third embodiment has a difference in terms of such a point that the peak power reduction circuit 2 is configured at multi stages (circuits) 2A-2C, while other configurations are the same. Note that the same components are marked with the same reference numerals and symbols, and the iterative explanations thereof are omitted.

In the transmitting device 10 according to the third embodiment, the peak power reduction circuit 2A reduces (the peak power of) the modulation signal transmitted from the input-side circuit 1, an output of the peak power reduction circuit 2A undergoes again the peak power reduction in the posterior peak power reduction circuit 2B, then an output of the peak power reduction circuit 2B further undergoes the peak power reduction in the further posterior peak power reduction circuit 2C, and the output circuit 3 synthesizes and transmits an output of the peak power reduction circuit 2C.

Thus, in the third embodiment, the plurality of peak power reduction circuits 2A-2C is provided in series, and the output of each anterior circuit is inputted to each posterior circuit, thereby conducting the peak power reduction plural number of times.

This scheme is for surely reducing the peak power through the repetitive reductions for such a reason that the peak power obtained by the peak power detecting unit 22 consists of a total sum of the modulation signals S1-S3, while the peak power is reduced in the way of changing the reduction quantity on the per-modulation-method basis according to the present invention, and hence there is a possibility that the whole reduction quantity might not be coincident with the peak power.

Moreover, in the third embodiment, the reduction quantity on the per-modulation-method basis is differentiated not by changing the coefficient of the reducing unit 24 but by differentiating a reduction target modulation signal count in each stage of the peak power reduction circuits 2A-2C. To be specific, the peak power reduction circuit 2A reduces the peak power of only the modulation signal S1, the peak power reduction circuit 2B reduces the peak power of the modulation signals S1, S2, and the peak power reduction circuit 2C reduces the peak power of all of the modulation signals S1-S3.

With this scheme, at first, the peak power of the modulation signal S1 having the lowest quality is reduced, and the peak power, which could not be reduced as a result, i.e., the peak power of the modulation signals S1, S2 in the regions in excess of the threshold value of the peak power reduction circuit 2B is reduced. Further, the peak power, which could not be reduced as a result, i.e., the peak power of all of the modulation signals S1-S3 in the regions in excess of the threshold value of the peak power reduction circuit 2C is reduced.

Herein, let L1, L2, L3 be the threshold values of the peak power detecting units 22 of the respective peak power reduction circuits 2A, 2B, 2C, and the threshold values L1-L3 may be equalized and may also be differentiated such as L1<L2<L3 and L1>L2>L3.

Further, in the third embodiment also, the rate detecting unit 26 detects the rate of the input signals on the per-modulation-method basis, which occupy the whole input signals, and the peak power detecting unit 22 changes the threshold values L1, L2, L3 corresponding to the detected rate.

For example, the reduction quantity of the peak power reduction circuit 2A is increased by decreasing the threshold value L1 if the rate of the QPSK is high, the reduction quantity of the peak power reduction circuit 2B is increased by decreasing the threshold value L2 if the rate of the 16QAM is high, and the reduction quantity of the peak power reduction circuit 2C is increased while decreasing the reduction quantities of the peak power reduction circuits 2B, 2A by decreasing the threshold value L3 as well as raising the threshold values L2, L1 if the rate of the 64QAM is high, thus enabling the control to be done. Namely, the peak power is detected by use of the threshold value differentiated on the per-modulation-signal basis, thereby differentiating the reduction quantity of the reduction signal.

It should be noted that all of the peak power reduction circuits 2A-2C are provided with the rate detecting units 26 to thereby change the threshold value in the third embodiment, however, the threshold value may also be changed by only some of the peak power reduction circuits without being limited to the configuration described above. For instance, if configured to provide only the peak power reduction circuit 2A for the input signal S1 having the lowest quality with the rate detecting unit 26 in order to change the threshold value, whereby it is feasible to have flexibility to the change of the rate of the modulation method with the simple configuration.

As discussed above, according to the third embodiment, the peak power can be reduced at the high accuracy by the peak power reduction circuits 2A-2C configured at the multi-stages.

Figure 7:
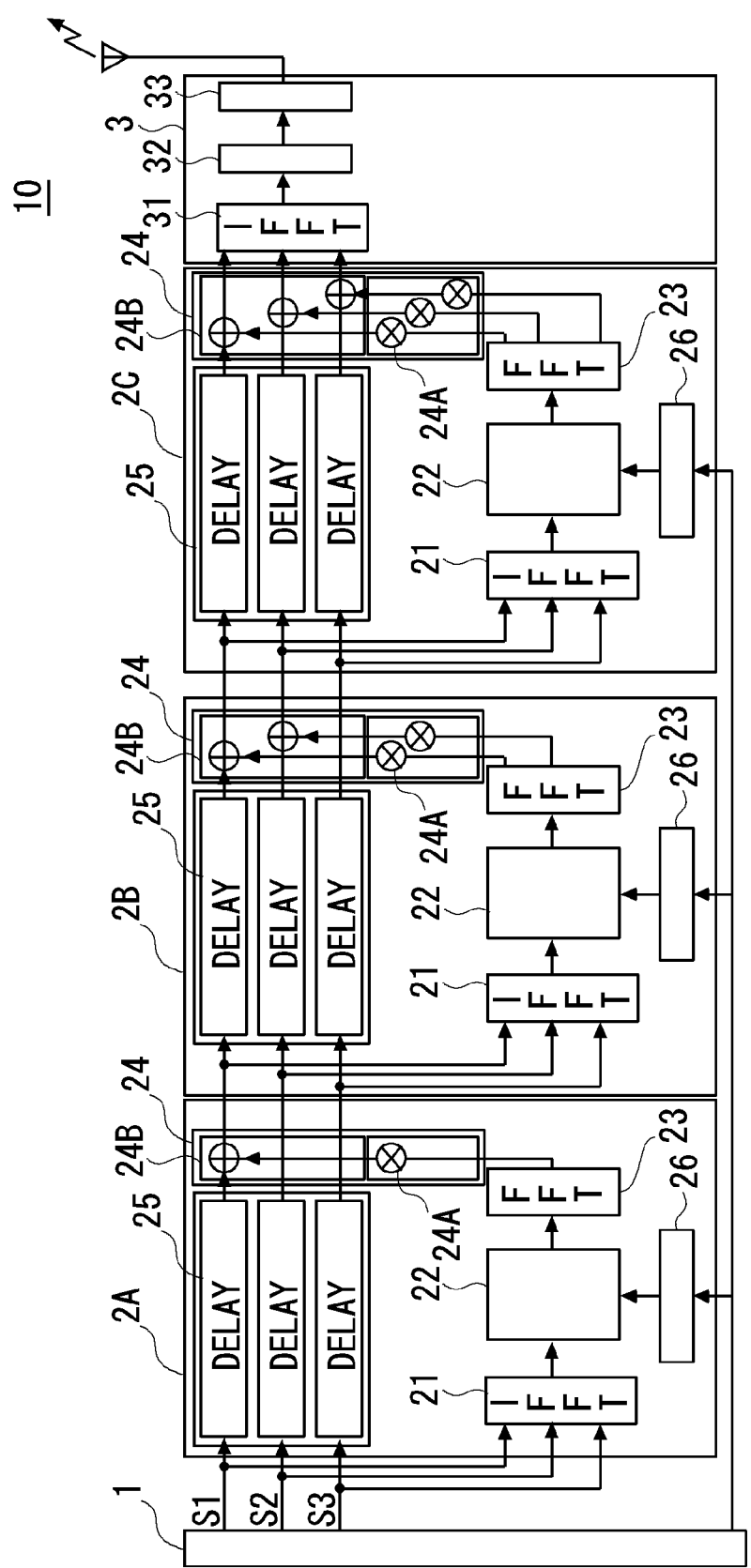
FIG. 7 is a diagram illustrating a modified example of the transmitting device in the third embodiment.

Incidentally, the example of FIG. 6 is that the reduction signal generated by the reduction signal generating unit 23 is added directly to the modulation signal at the reducing point 24B in a way that omits the adjusting unit 24A of the reducing unit 24, however, without being limited to this configuration, another available configuration is that the adjusting unit 24A, as illustrated in FIG. 7, multiplies the reduction signal by the coefficient and is thereafter added to the modulation signal at the reducing point 24B.

Fourth Embodiment

Figure 8:
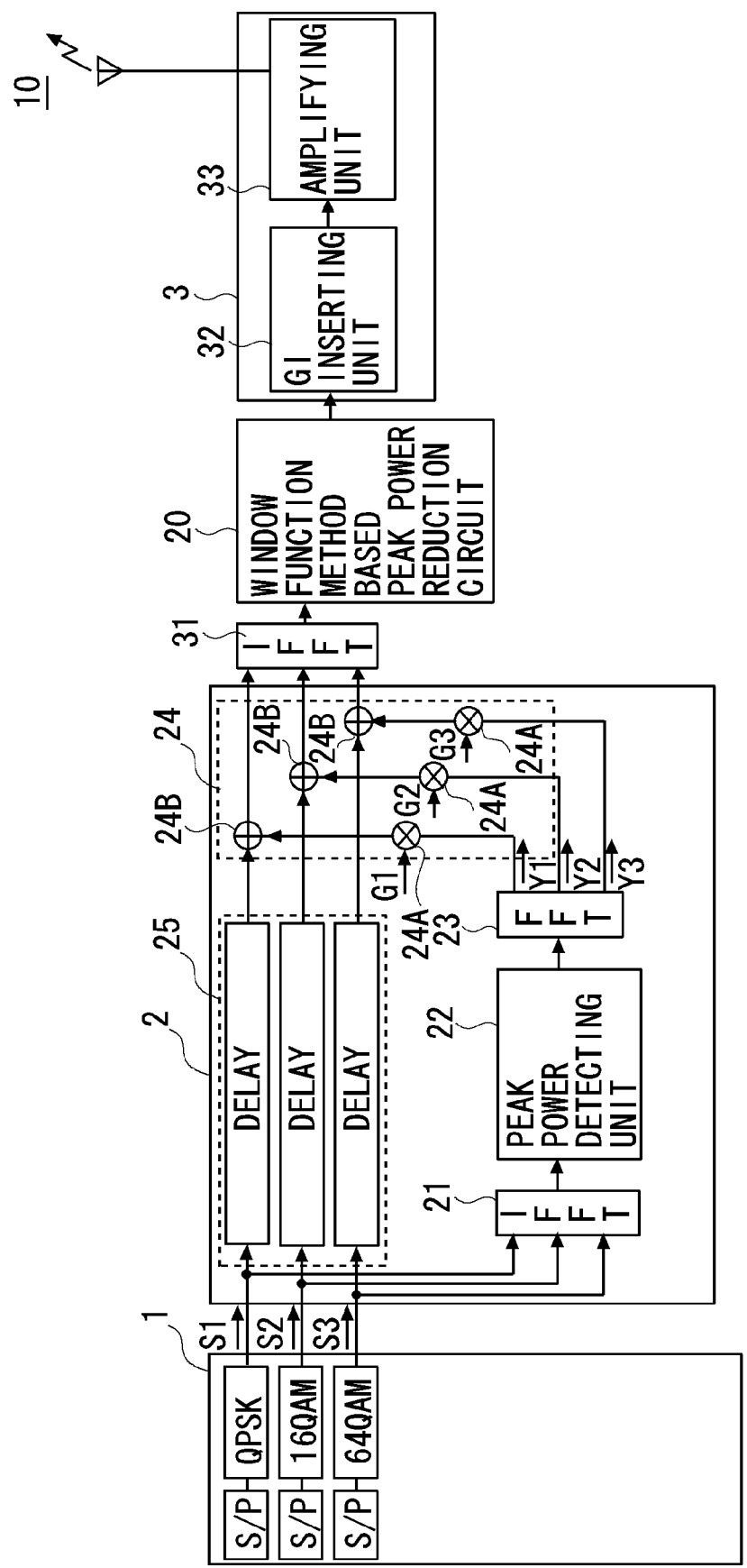
FIG. 8 is a schematic diagram of a configuration of the transmitting device in a fourth embodiment according to the present invention.

FIG. 8 is a schematic diagram of a fourth embodiment according to the present invention. As compared with the first embodiment discussed above, the fourth embodiment has a difference in terms of such a point that the peak power reduction circuit 2 is configured at multi stages, while other configurations are the same. Note that the same components are marked with the same reference numerals and symbols, and the iterative explanations thereof are omitted.

In the fourth embodiment, a peak power reduction circuit 20 taking a different method is provided in series to the peak power reduction circuit 2 described above.

The peak power reduction circuit (window function reducing unit) 20 is a so-called window system circuit which restrains the value of the transmission signal with a window function. Note that the peak power reduction circuit based on the window function has a well-known configuration, and hence an in-depth description thereof is omitted.

According to the fourth embodiment, after the peak power reduction circuit 2 according to the present invention has reduced the peak power on the per-modulation-method basis, the synthesizing unit (IFFT unit) 31 conducts the synthesization, and the window system peak power reduction circuit 20 reduced the peak power of the regions that could not be reduced.

The peak power reduction circuit can easily be thereby configured at the multi-stages, and the peak power can be reduced at the high accuracy.

Note that the example in FIG. 8 illustrates the configuration of adding the peak power reduction circuit 20 to the first embodiment discussed above, however, without being confined to this configuration, another available configuration is that the peak power reduction circuit 20 is applied to other second and third embodiments. For instance, the peak power reduction circuit 2C disposed at the last stage (for reducing the peak power of all of the modulation signals) in the third embodiment may be replaced by the peak power reduction circuit 20.

Fifth Embodiment

Figure 9:
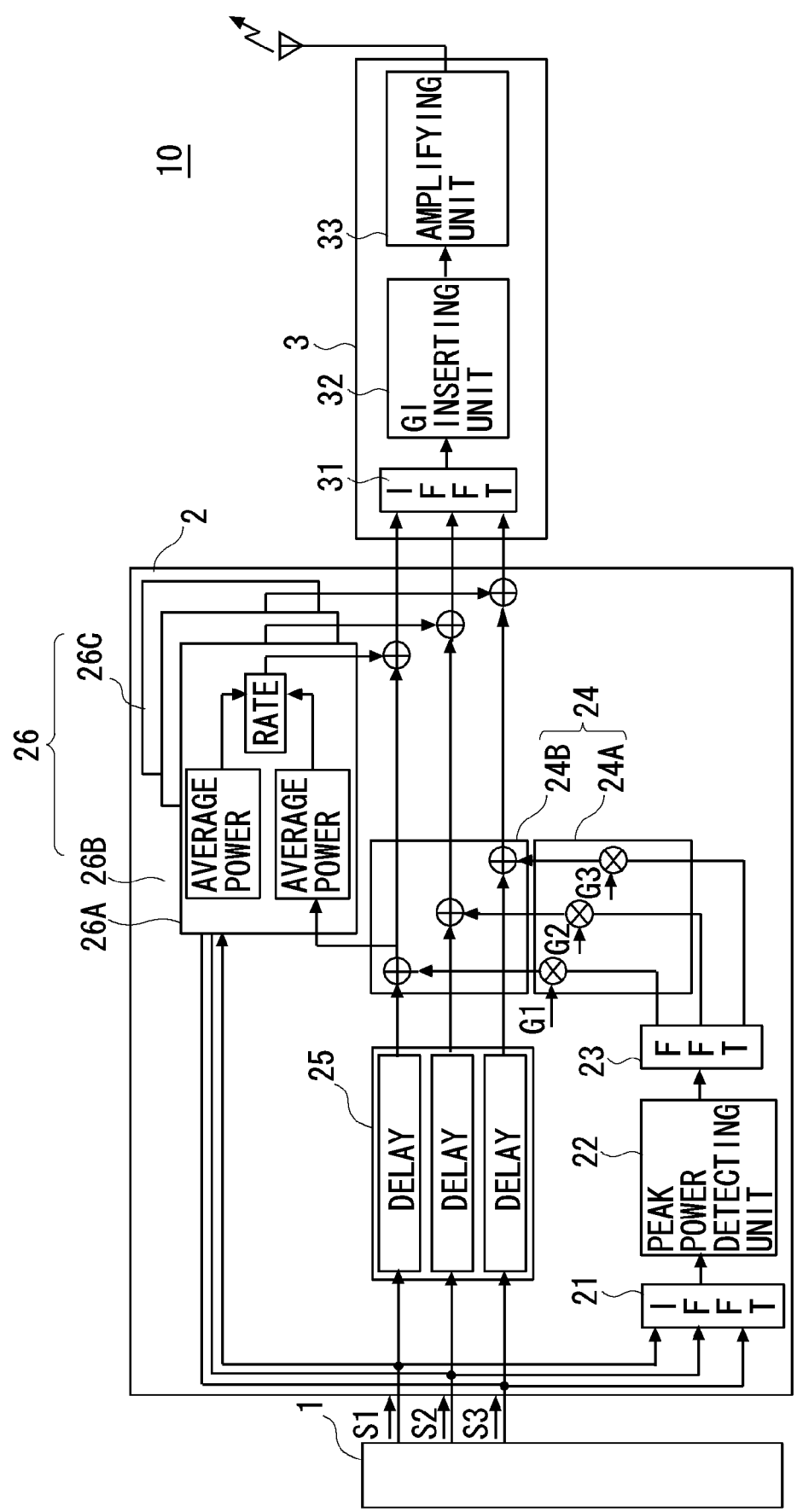
FIG. 9 is a schematic diagram of a configuration of the transmitting device in a fifth embodiment according to the present invention.

FIG. 9 is a schematic diagram of a fifth embodiment according to the present invention. As compared with the first embodiment discussed above, the fifth embodiment has a difference in terms of including a power compensating unit 26, while other configurations are the same. Note that the same components are marked with the same reference numerals and symbols, and the iterative explanations thereof are omitted.

As stated above, in the case of reducing the peak power of the modulation signal, if the reduction rises, the average power might decrease. Therefore, the fifth embodiment is provided with the power compensating unit 26 which obtains a decrease in average power due to the reduction of the peak power of the input signal and compensates an average output by adding the power equivalent to this decrease to the input signal.

Note that the power compensating unit 26 in the fifth embodiment is constructed of power compensating units 26A-26C for the input signals S1-S3.

The power compensating unit 26A includes a pre-reduction detecting unit 61, a post-reduction detecting unit 62 and a power supplementing unit 63.

The pre-reduction detecting unit 61 detects the average power of the modulation signal S1 received from the input-side circuit 1.

The post-reduction detecting unit 62 detects the average power of the modulation signal S1 after being reduced by the reducing unit 24.

The power supplementing unit 63 obtains a decrease in power due to the reduction by comparing the pre-reduction average power with the post-reduction average power, and multiplies the post-reduction modulation signal S1 by the decreased power.

Similarly, the power compensating unit 26B includes the pre-reduction detecting unit, the post-reduction detecting unit and the power supplementing unit, detects and compares the average power of the modulation signal S2 received from the input-side circuit 1 and the average power of the modulation signal S2 after being reduced by the reducing unit 24 with each other, and multiplies the post-reduction modulation signal S2 by the decreased power.

Moreover, the power compensating unit 26C includes the pre-reduction detecting unit, the post-reduction detecting unit and the power supplementing unit, detects and compares the average power of the modulation signal S3 received from the input-side circuit 1 and the average power of the modulation signal S3 after being reduced by the reducing unit 24 with each other, and multiplies the post-reduction modulation signal S3 by the decreased power.

The output circuit 3 synthesizes the modulation signals after the power compensation, then amplifies the synthesized signals and outputs the radio signals.

Thus, according to the fifth embodiment, the decrease in average power due to the reduction of the peak power is compensated, and hence, even when the reduction of the peak power rises, the output as specified by the rating is acquired.

Incidentally, the example in FIG. 9 illustrates the configuration of adding the power compensating unit 26 to the first embodiment discussed above, however, without being limited to this configuration, another available configuration is that the power compensating unit 26 is added to other second through fourth embodiments.

Sixth Embodiment

Figure 10:
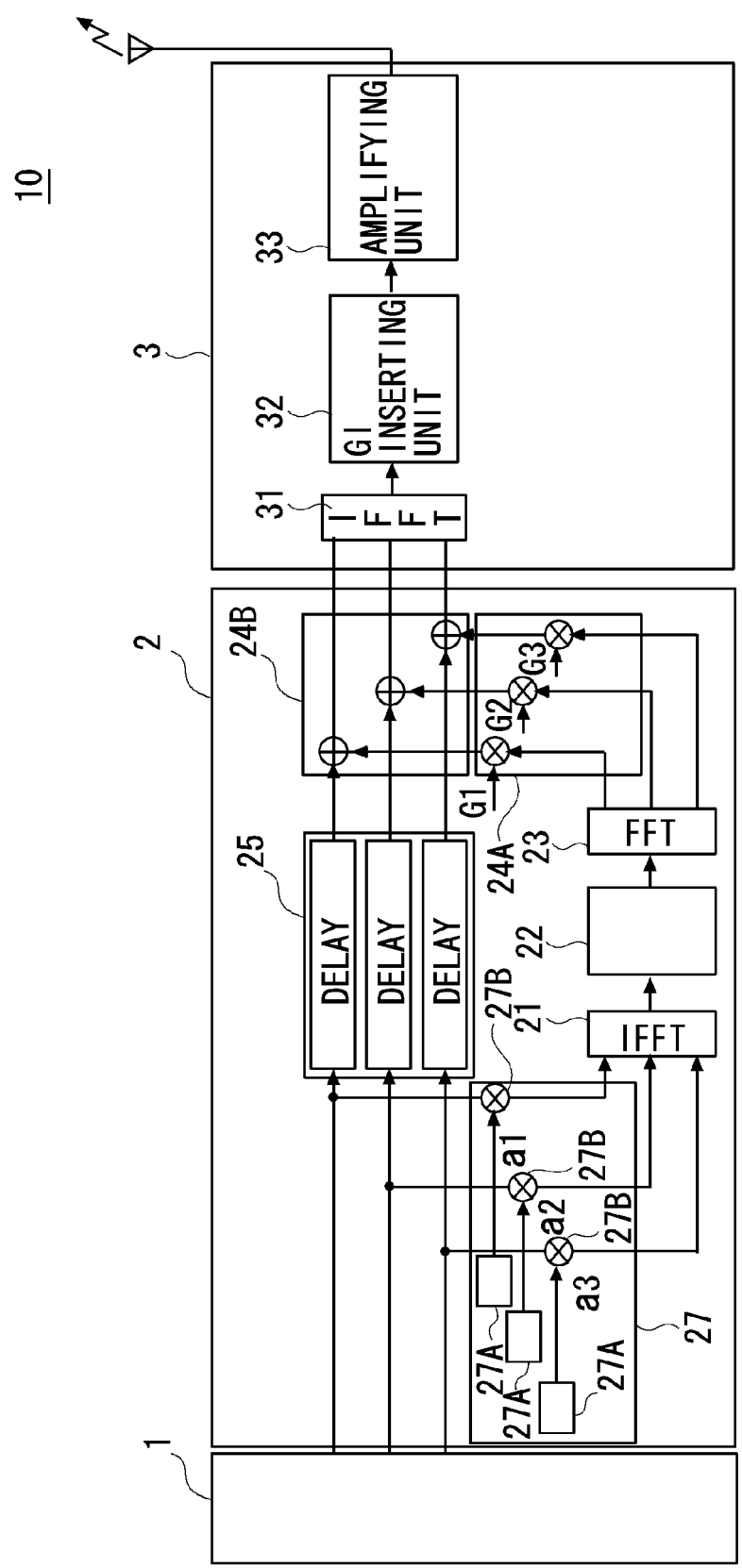
FIG. 10 is a schematic diagram of a configuration of the transmitting device in a sixth embodiment according to the present invention.

FIG. 10 is a schematic diagram of a sixth embodiment according to the present invention. As compared with the first embodiment discussed above, the sixth embodiment has a difference in terms of including a power compensating unit 27, while other configurations are the same. Note that the same components are marked with the same reference numerals and symbols, and the iterative explanations thereof are omitted.

In the power compensating unit 27 according to the sixth embodiment, an estimation unit 27A provided on the per-modulation-method basis calculates a decrease quantity of the power after reducing the peak power corresponding to the value of the input signal, and each multiplying unit 27B multiplies each of the input signals S1-S3 by the power equivalent to the decrease quantity.

Note that the estimation of the decrease quantity of the power by the estimation unit 27A involves statistically acquiring beforehand an associative relationship between the value of the pre-reduction modulation signal and the decrease quantity of the power of the post-reduction modulation signal, and setting a conversion table or functions based on this associative relationship. Namely, the estimation unit 27A univocally obtains the decrease quantity of the power from the value of the pre-reduction modulation signal by use of this conversion table.

Thus, according to the sixth embodiment, the decrease in power due to the reduction of the peak power is compensated, and therefore even when the reduction of the peak power rises, the output as specified by the rating is acquired.

Note that the example in FIG. 10 illustrates the configuration of adding the power compensating unit 27 to the first embodiment discussed above, however, without being limited to this configuration, another available configuration is that the power compensating unit 27 is added to other second through fourth embodiments.

What is claimed is:

1. A peak power reduction circuit comprising:
   a synthesized signal generating unit to generate a synthesized signal in a time domain from input signals taking different modulation methods;
   a peak power detecting unit to detect at least one region, exceeding a threshold value, of the synthesized signal to generate a peak power signal corresponding to the at least one region and power of the synthesized signal in the at least one region;
   a reduction signal generating unit to convert the peak power signal into a signal in a frequency domain, to make at least one signal of the signal in a frequency domain, and to organize at least one signal into at least one reduction signal; and
   a reducing unit to reduce the power by adding the at least one reduction signal with a reduction quantity differentiated on a per-modulation-method basis to at least one of the input signals.

2. The peak power reduction circuit according to claim 1, wherein the reducing unit differentiates the reduction quantity in a way that multiplies the at least one reduction signal by a coefficient that is different on a per-modulation method basis.

3. The peak power reduction circuit according to claim 2, wherein in the input signals taking the different modulation methods, a coefficient of a reduction signal added to an input signal taking a modulation method having a high tolerance of modulation accuracy is set higher than a coefficient of a reduction signal added to an input signal taking a modulation method having a low tolerance of the modulation accuracy.

4. The peak power reduction circuit according to claim 1, wherein the peak power detecting unit detects the at least one region by use of a threshold value different on the per-modulation-method basis, thereby differentiating the reduction quantity of the at least one reduction signal.

5. The peak power reduction circuit according to claim 1, further comprising
   a rate detecting unit to obtain a rate of the input signals on the per-modulation-method basis in a whole of the input signals,
   wherein the peak power detecting unit determines the threshold value in accordance with the rate.

6. The peak power reduction circuit according to claim 1, further comprising
   a power compensating unit to obtain a decrease in power of the at least one of the input signals by the reduction unit on the basis of the at least one of the input signals, and to add power equivalent to the obtained decrease to the at least one of the input signals.

7. The peak power reduction circuit according to claim 6, wherein the power compensating unit obtains the decrease in the power of the at least one of the input signals by comparing the at least one of the input signals before adding the at least one reduction signal with at least one of the input signals after adding the at least one reduction signal.

8. The peak power reduction circuit according to claim 1, further comprising
   plural sets of the synthesized signal generating unit, the peak power detecting unit, the reduction signal generating unit, and the reducing unit.

9. The peak power reduction circuit according to claim 1, further comprising
a window function reducing unit to reduce the power of at least one signal after the reduction unit by use of a window function method.

10. A transmitting device comprising:
a peak power reduction circuit comprising:
a synthesized signal generating unit to generate synthesized signal in a time domain from input signals taking different modulation methods;
a peak power detecting unit to detect at least one region, exceeding a threshold value, of the synthesized signal and to generate a peak power signal corresponding to the at least one region and power of the synthesized signal in the at least one region;
a reduction signal generating unit to convert the peak power signal into a signal in a frequency domain, to make at least one signal of the signal in a frequency domain, and to organize at least one signal into at least one reduction signal; and
a reducing unit to reduce the power by adding the at least one reduction signal with a reduction quantity differentiated on a per-modulation-method basis to at least one of the input signals.

11. A peak power reduction method by which a peak power reduction circuit, executing:
generating a synthesized signal in a time domain from input signals taking different modulation methods;
detecting at least one region, exceeding a threshold value, of the synthesized signal and generating a peak power signal corresponding to the at least one region and power of the synthesized signal in the at least one region;
converting the peak power signal into a signal in a frequency domain, making at least one signal of the signal in a frequency domain, and organizing at least one signal into at least one reduction signal; and
reducing the power by adding the at least one reduction signal with a reduction quantity differentiated on a per-modulation-method basis to at least one of the input signals.

12. The peak power reduction method according to claim 11,
wherein the reduction quantity is differentiated in a way that multiplies the at least one reduction signal by a coefficient that is different on a per-modulation-method basis.

13. The peak power reduction method according to claim 12,
wherein in the input signals taking the different modulation methods, a coefficient of a reduction signal added to an input signal taking a modulation method having a high tolerance of modulation accuracy is set higher than a coefficient of a reduction signal added to an input signal taking a modulation method having a low tolerance of the modulation accuracy.

14. The peak power reduction method according to claim 11,
wherein the at least one region is detected by use of a threshold value different on the per-modulation-method basis, thereby differentiating the reduction quantity of the at least one reduction signal.

15. The peak power reduction method according to claim 11,
wherein a rate of the input signals on the per-modulation-method basis in a whole of the input signals, is obtained, and
the threshold value is determined in accordance with the rate.

16. The peak power reduction method according to claim 11,
wherein a decrease in power of the at least one of the input signals is obtained based on the at least one of the input signals, and the decrease in the power of the at least one of the input signals is compensated by adding power equivalent to the obtained decrease to the at least one of the input signals.

17. The peak power reduction method according to claim 16,
wherein the decrease in the power of the at least one of the input signals is obtained by comparing the at least one of the input signals before adding the at least one reduction signal with at least one of the input signals after adding the at least one reduction signal.

18. The peak power reduction method according to claim 11, wherein the detecting, the converting, and the reducing are repeated in a way that sets at least one signal after adding the at least one reduction signal as at least one of the input signals.

19. The peak power reduction method according to claim 11, wherein the power of at least one signal after the reducing is reduced by use of a window function method.

* * * * *